Patented July 4, 1950

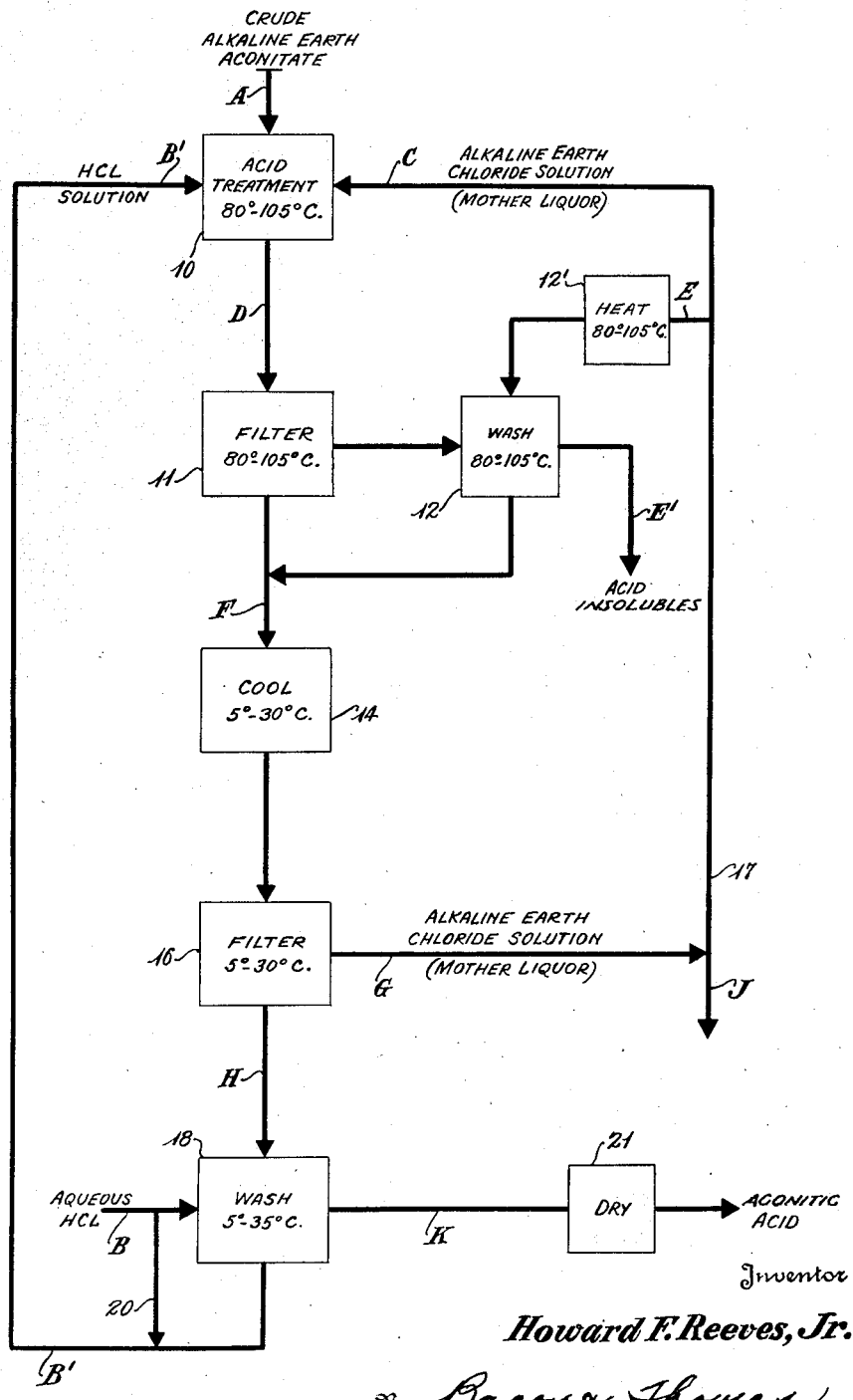

2,514,010

UNITED STATES PATENT OFFICE 2,514,010

RECOVERY AND PURIFICATION OF ACONITIC ACID

Howard F. Reeves, Jr., Weeks, La., assignor, by mesne assignments, to Morton Salt Company, Chicago, Ill., a corporation of Illinois Application June 9, 1947, Serial No. 753,559

15 Claims. (Cl. 260—537)

This invention relates to an acid recovery process, and more particularly, to a process involving hydrochloric acid reduction of alkaline earth aconitates in which a high yield of substantially pure aconitic acid is obtained in a simple and economical manner.

Aconitic acid occurs in certain plant juices for example, sorgo juice, cane juice and sugar beet juice. It is present in some juices both as the free acid and in combination with metals, principally alkaline earth metals, such as calcium or magnesium. It is usually recovered from such juices in amorphous or crystalline form as impure calcium and magnesium aconitates, for example, by the process disclosed in the patent to Ventre et al., No. 2,359,537. Such impure aconitates vary considerably in composition and may, for example, contain between approximately 50 and 60% aconitic acid, between approximately 17 and 21% total calcium and magnesium, and between approximately 20 to 30% water. In addition, they contain various impurities which are substantially insoluble in hydrochloric acid and which may be termed acid insolubles, the amount of such impurities ranging from approximately 0.4% to 10%. Exclusive of the acid insolubles, the crude aconitates usually approach rather closely to dicalcium magnesium aconitate plus 6H₂O although the ratio of calcium and magnesium may vary somewhat from that in the specific salt mentioned and also the water content may vary to a considerable extent. Hydrochloric acid will react with the aconitates to produce alkaline earth chlorides and aconitic acid. However, no effective process has heretofore been known for economically recovering substantially pure aconitic acid from crude alkaline earth aconitates.

The present invention involves the discovery that aconitic acid has substantial solubility in aqueous solutions of alkaline earth chlorides of proper concentration at elevated temperatures, for example, between 80° and 105° C. and that it has very low solubility in the same solutions at lower temperatures, for example, between 5° and 30° C. High yields of aconitic acid can therefore be obtained by crystallization of the aconitic acid from solutions of alkaline earth chlorides. The present invention also involves the discovery that aconitic acid also has very low solubility in hydrochloric acid solutions of proper concentration in approximately the same range of low temperatures mentioned above, whereas the alkaline earth chlorides have high solubility in such solutions under the same conditions. A hydrochloric acid solution may therefore be employed to remove residual alkaline earth chlorides from the crystals of aconitic acid and then employed to react with additional amounts of alkaline earth aconitates. The residual alkaline earth chlorides wash cleanly from the crystals with very little solution of aconitic acid.

In the above discussion and throughout the present application except where otherwise stated, the concentrations of hydrochloric acid are calculated on the basis of the water and hydrogen chloride present exclusive of other materials. Also, the concentrations of alkaline earth chlorides are calculated on the basis of the water and alkaline earth chlorides present exclusive of other materials. In all cases, the proportions and concentrations are by weight.

In general, hydrochloric acid solutions of the correct concentration and amount to substantially completely react with alkaline earth aconitates and dissolve the aconitic acid produced, do not produce solutions of alkaline earth chlorides of the correct concentration for effective recovery of the aconitic acid from such solutions by crystallization. That is to say, a hydrochloric acid solution of sufficient concentration to produce the correct concentration of alkaline earth chloride solution is, in general, too concentrated to react with and dissolve all of the aconitate since aconitic acid reaches saturation in the hydrochloric acid and alkaline earth chloride solution before all of the aconitate is reacted and dissolved. A large excess of hydrochloric acid solution will decrease the concentration of the aconitic acid in the solution so as to cause all of the aconitate to be reacted but most of the excess hydrochloric acid is lost in the process. However, by adding a solution of alkaline earth chlorides, preferably a solution obtained from a previous run, hydrochloric acid solutions of the correct concentration can be employed to react with the aconitates. Furthermore, the hydrochloric acid can be employed in a very slight excess so that the loss of hydrochloric acid is reduced to a very small amount.

It is therefore an object of the present invention to provide an improved process of recovering substantially pure aconitic acid from crude alkaline earth aconitates.

Another object of the invention is to provide a process of recovering substantially pure aconitic acid from crude alkaline earth aconitates in which aqueous hydrochloric acid is employed to react with the aconitates and aconitic acid is crystallized from the resulting solution of alkaline earth chlorides.

Another object of the invention is to provide a process of recovering substantially pure aconitic acid from alkaline earth aconitates in which aqueous hydrochloric acid is employed to purify aconitic acid crystallized from an alkaline earth chloride solution, and the aqueous hydrochloric acid is then employed to produce additional aconitic acid in the process.

A further object of the invention is to provide a process of recovering substantially pure aconitic acid from alkaline earth aconitates in which the aconitates are reacted with aqueous hydrochloric acid in the presence of an added amount of a solution of alkaline earth chlorides to produce a resulting solution of alkaline earth chlorides containing aconitic acid and of the correct concentration for crystallization of aconitic acid therefrom.

Other objects and advantages will appear in the following description of the invention given in connection with the attached drawing which is a diagrammatic flow sheet of a preferred embodiment of the process.

As shown in the drawing, the alkaline earth aconitates are treated with aqueous hydrochloric acid in an acid treatment step indicated at 10. This acid treatment is preferably carried out in a suitable container and with agitation at a temperature between approximately 80° and 105° C. A closed container or reflux condensation is preferably employed to prevent loss of hydrochloric acid and water by vaporization. Sufficient aqueous hydrochloric acid is employed to provide a small excess of hydrochloric acid. Thus, alkaline earth aconitate may be introduced into the acid treatment step as indicated by the line A. Aqueous hydrochloric acid may be introduced into the acid treating step as indicated by the line B' after it has been employed to wash crystallized aconitic acid as explained in more detail below. Alkaline earth chloride solution from a succeeding step in the process may be returned to the acid treating step 10 as indicated by the line C. In the acid treating step 10, the hydrochloric acid reacts with the aconitates to form alkaline earth chlorides and liberate free aconitic acid. At a temperature of 80° to 105° C., the aconitic acid is quite soluble in the resulting alkaline earth chloride solution. The acid treatment is continued until all of the aconitates have been converted, which will ordinarily occur within 20 minutes to 1 hour. Enough alkaline earth chloride solution is introduced into the acid treating step 10 so that the amount of aconitic acid in the resulting alkaline earth chloride solution is somewhat below saturation. A small amount of material remains undissolved and this material is the acid insolubles which constitute an impurity in the crude alkaline earth aconitate.

The resulting material is discharged from the acid treating step 10 as indicated by the line D and subjected to a filtration step indicated at 11 for removing the acid insolubles. This filtration step is also preferably carried out at a temperature between approximately 80° and 105° C. to prevent loss of aconitic acid with the acid insolubles. The acid insolubles removed in the filtration step 11 may be washed in a washing step as indicated at 12 with an additional amount of alkaline earth chloride solution indicated by the line E to remove adhering solution containing aconitic acid. The temperature of the washing liquor is also preferably between 80° and 105° C. and the washing liquor may be heated as indicated at 12' to such temperature. The acid insolubles, substantially free of aconitic acid are discharged from the process as indicated by the line E'.

The filtrate from the filtration step 11, as well as that from the washing step 12 may be combined as indicated by the line F and cooled in a cooling step as indicated at 14, to a temperature between approximately 5° and 30° C. The material in the cooling step 14 is substantially the same as that entering the filtration step 11 except that the acid insolubles have been removed. During cooling, aconitic acid crystallizes out and the cooled material is then filtered as indicated at 16, the filtrate or mother liquor as indicated by the line G being essentially a solution of alkaline earth chlorides containing a small amount of aconitic acid and a small amount of hydrochloric acid. A portion of this alkaline earth chloride solution or mother liquor is returned to the process as indicated by the line 17. The mother liquor is then divided into two portions, a part of which is delivered back to the acid treatment step 10 as indicated by the line C and a portion, indicated by the line E, employed to wash the acid insolubles from the filtration step 11. A portion of the mother liquor is also discharged from the process as indicated by the line J.

The crystallized aconitic acid from the filtration step 16 is then washed, as indicated at 18, with aqueous hydrochloric acid to remove residual alkaline earth chloride solution from the aconitic acid crystals. The aqueous hydrochloric acid employed to wash the aconitic acid crystals is preferably employed to react with additional alkaline earth aconitates in the process as any aconitic acid dissolved therein, in the washing step, is thus returned to the process. The process is, however, entirely operable if the aqueous hydrochloride used to wash the aconitic acid crystals is discharged from the process and other aqueous hydrochloric acid used to react with the aconitate. It is preferred, however, to employ all or a portion of the aqueous hydrochloric acid used in the process to wash the aconitic acid crystals and in the latter case, the portion of the aqueous hydrochloride solution not used to wash the crystals may bypass the washing step as indicated by the line 20. The wash liquor may be combined with any aqueous hydrochloric acid not used for washing and returned to the acid treatment step 10, as indicated by the line B'. The washed, substantially pure aconitic acid crystals may be discharged from the process as indicated by the line K and dried as indicated at 21 to remove residual water and hydrochloric acid.

As a specific example of a process in accordance with the flow diagram just described, the composition of the materials in the various stages

Table I

|  | A | B | B' | C | D | E | E' | F | G | H | J | K |
|---|---|---|---|---|---|---|---|---|---|---|---|---|
| Aconitic Acid Radical | 54.0 | | | | | | | | | | | |
| Aconitic Acid | | | 0.4 | 1.9 | 57.3 | 1.0 | 0.1 | 58.3 | 6.9 | 51.4 | 3.9 | 51.0 |
| Calcium | 15.0 | | | | | | | | | | | |
| CaCl$_2$ | | | 3.6 | 20.3 | 65.5 | 10.1 | 1.4 | 74.2 | 70.6 | 3.6 | 40.2 | |
| Magnesium | 3.5 | | | | | | | | | | | |
| MgCl$_2$ | | | 1.2 | 6.8 | 21.7 | 3.4 | 0.5 | 24.6 | 23.4 | 1.2 | 13.2 | |
| Acid Insolubles | 3.5 | | | | 3.5 | | 3.5 | | | | | |
| Water | 24.0 | 124.5 | 132.5 | 70.3 | 226.3 | 35.2 | 5.0 | 256.4 | 244.0 | 12.4 | 138.6 | 4.5 |
| HCl | | 41.5 | 40.2 | 1.0 | 3.2 | 0.5 | 0.1 | 3.6 | 3.4 | 0.2 | 1.9 | 1.5 |
| | 100.0 | 166.0 | 177.9 | 100.3 | 377.5 | 50.2 | 10.6 | 417.1 | 348.3 | 68.8 | 197.8 | 57.0 |

Loss:
3.5 parts HCl
4.0 parts aconitic acid.

In the above table, the crude alkaline earth aconitate is assumed to have the composition shown by column A. The aqueous hydrochloric acid solution entering the process as shown by column B is assumed to contain 124.5 parts water and 41.5 parts hydrochloric acid by weight. This is approximately a 25% solution of hydrochloric acid providing an excess of about 9.2% over that required to react with the aconitate. This solution is employed to wash the aconitic acid crystals from the filtering step 16. The aqueous hydrochloric acid solution removes residual mother liquor from the crystals, which mother liquor contains a small amount of alkaline earth chlorides, aconitic acid and hydrochloric acid. A small amount of hydrochloric acid and water remains on the aconitic acid crystals after the washing stage, such that the composition of the wash liquor after the washing operation may be approximately that shown in column B'. This is approximately a 23% solution of hydrochloric acid containing small amounts of alkaline earth chlorides and aconitic acid and is employed for treating additional amounts of crude alkaline earth aconitate in the acid treating step 10. The mother liquor or alkaline earth chloride solution returned to the acid treatment step 10 may have a composition approximately that shown in column C and is employed in approximately 100 parts per 100 parts crude alkaline earth aconitate. This solution is essentially an alkaline earth chloride solution having a concentration of approximately 27.8% and containing small amounts of aconitic acid and hydrochloric acid. The actual excess of hydrochloric acid entering the acid treating step is approximately 6.5%.

After the acid treatment the material discharged from the acid treatment step may have a composition approximately that shown in column D and is essentially an alkaline earth chloride solution having a concentration of approximately 27.8% and containing a substantial amount of aconitic acid dissolved therein as well as a small amount of acid insolubles and excess hydrochloric acid. The alkaline earth chloride solution employed to wash the acid insolubles from the filter step 11 has the same composition as the alkaline earth chloride solution introduced into the acid treatment step, i. e., the composition shown in column E. For example, approximately 50 parts of this solution may be employed for each 100 parts of crude alkaline earth aconitate entering the process. A small amount of the washing liquor is lost by adherence to the acid insolubles, the approximate composition of the residue from the washing step 12 being shown by the column E'. The combined filtrate from the filtering and washing steps may have a composition approximately that shown in column F. It is essentially an aqueous solution of alkaline earth chlorides having a concentration of approximately 27.8% in which is dissolved aconitic acid and a small amount of hydrochloric acid. The mother liquor removed from the aconitic acid crystals in the filtering step 16 may have a composition approximately that shown in column G and is essentially a solution of alkaline earth chlorides having a concentration of approximately 27.8% and containing a small amount of aconitic acid and hydrochloric acid.

The aconitic acid crystals, after the filtration step 16, still contain a considerable amount of adhering mother liquor and may have a composition approximately that shown in column H. After being washed in the washing step 18, with a part or all of the hydrochloric acid solution entering the process, the aconitic acid crystals contain a small amount of adhering water and hydrochloric acid and may have a composition approximately that shown in column K. The mother liquor adhering to the aconitic acid crystals after the filtration step 16 and before the washing step 18 is apparently substantially all on the surface of the crystals as it can be cleanly washed therefrom by the aqueous hydrochloric acid with very little solution of the aconitic acid in the aqueous hydrochloric acid. After drying, as indicated at 21, which drying step volatilizes substantially all of the hydrochloric acid and the greater portion of the water, the aconitic acid crystals will, in general, have a purity appearing in the neighborhood of 99.7%, i. e., they contain less than 0.5% impurities.

The mother liquor discharged from the process may have a composition approximately that indicated in column J. This, in conjunction with the small loss in the residue E' from the washing step 12, represents substantially the only loss of aconitic acid from the process. Since 54 parts aconitic acid radical is the equivalent of approximately 55 parts aconitic acid and approximately 4 parts are lost, the recovery of aconitic acid in the specific example given is approximately 93%. By maintaining a small excess of hydrochloric acid in the process, the amount of hydrochloric acid lost is very small. This is represented by the 1.9 parts hydrochloric acid lost with the mother liquor, the 0.1 part lost in the washing step 12 and the 1.5 parts of hydrochloric acid carried out of the process with the aconitic acid crystals. The above discussion deals with a specific example only and the amounts and concentrations can be varied considerably without materially changing the recovery and purity of the product or without materially increasing the loss of hydrochloric acid so long as the excess of hydrochloric acid is not materially increased.

Thus, the concentration of the hydrochloric acid introduced into the process may range between approximately 17 and 35%, the preferred range being between 20 and 30% and the optimum range being approximately 24 to 25%. Since the amount of water in the crude alkaline earth aconitate will vary considerably and this water, as well as the water added with the hydrochloric acid, determines the actual concentration of the hydrochloric acid entering the process, this concentration can be expressed by taking into consideration the water added with the alkaline earth aconitate. When the water in the aconitate is considered, the range of hydrochloric acid concentration will lie between approximately 14.5% and 30%, with a preferred range between approximately 18 and 25.5%. This is the concentration which determines the concentration of the resulting alkaline earth chloride solution. If the concentration of the hydrochloric acid introduced into the process is substantially above approximately 20%, or when the water in the aconitates is taken into consideration, above approximately 18%, all of the aconitate will either not react and dissolve or small aconitic acid crystals will precipitate, since aconitic acid in solution reaches saturation before all of the aconitate has reacted with the hydrochloric acid. In any event, filtration of the acid insolubles from the reaction mixture is interfered with and aconitic acid is lost with the acid insolubles. The acid may be diluted with water but this tends to give an alkaline earth chloride solution which is more dilute than desired for the crystallization step. A greater amount of the more concentrated acid can be employed, in which case a substantially complete reaction is obtained and all of the aconitic acid is dissolved, but this entails excessive loss of hydrochloric acid. The preferred operation is to dilute with alkaline earth chloride solution having approximately the same concentration as that produced in the acid treating step which is the same as diluting the hydrochloric acid without, however, diluting the resulting alkaline earth chloride solution. Dilution with an alkaline earth chloride solution free from aconitic acid will, however, cause increased loss of aconitic acid with mother liquor discharged from the process. By diluting with mother liquor from a previous filtration step, however, this mother liquor is already saturated with aconitic acid at the crystallizing temperature so that no loss of aconitic acid is occasioned by such dilution. The amount of mother liquor returned to the acid treatment step may be any reasonable amount so long as sufficient mother liquor is returned to cause all of the aconitate to be reacted with the hydrochloric acid and retained in solution during the filtration step for removing the acid insolubles. It is preferred to return a considerable excess of mother liquor over that required to cause all of the aconitate to be dissolved so as to reduce the concentration of the aconitic acid considerably below saturation at the temperature of reaction. Any unavoidable drop in temperature during the filtration step for removing the acid insolubles will then not cause any crystallization of the aconitic acid and consequent loss with the acid insolubles. Also, attempting to work with solutions in which the aconitic acid is at or very close to saturation at the higher temperatures frequently results in plugged filters and pipes due to deposition of aconitic acid crystals. The return of mother liquor to the acid treatment step avoids these difficulties, even though the hydrochloric acid introduced into the process is of sufficiently low concentration to dissolve all of the aconitic acid. On the other hand, the more mother liquor which is returned to the acid treatment step, the greater the amount of material which must be handled in the filtration step. As a practical range, it is contemplated returning an amount of mother liquor to the filtration step ranging between approximately 50% and 150% of the crude alkaline earth aconitates being reacted with hydrochloric acid.

For effective crystallization and recovery of the aconitic acid crystals from the mother liquor, it has been found that the alkaline earth chloride solution should have a concentration between approximately 21 and 35%, the preferred range being between approximately 24 and 33.5%. Within this range, the aconitic acid has relatively high solubility at temperatures in the neighborhood of 80° to 105° C., and very low solubility at temperatures between 5° and 30° C. The upper limit of concentration is set by the decreased solubility of aconitic acid in the solution and the resulting decreased differential of solubility at the high and low temperatures. The lower limit is set by the increased solubility of aconitic acid at low temperatures.

As stated above, the preferred operation is to employ an acid concentration which will give an alkaline earth chloride concentration within the range stated, and in case the acid concentration is too great to dissolve all of the aconitate when the acid is used in slight excess, dilution of the hydrochloric acid solution with an alkaline earth chloride solution within the range specified will cause all of the aconitate to react and dissolve without diluting the resulting alkaline earth chloride solution. The alkaline earth chlorides do not necessarily have to be those separated from aconitic acid in a previous filtration step but the use of such mother liquor saturated with aconitic acid at the temperature of such filtration reduces loss of aconitic acid in the mother liquor discharged from the process. In any case, it is apparent that the concentration of the alkaline earth chloride solution added to the acid treating step may be adjusted either by adding dry alkaline earth chlorides or by adding water thereto to give the correct resulting concentration of alkaline earth chlorides for crystallizing out aconitic acid even though the aqueous hydrochloric acid does not have the correct concentration. So far as solubility of aconitic acid in the alkaline earth chloride solutions is concerned, the various alkaline earth chlorides appear to be interchangeable. For example, calcium and magnesium chlorides appear to be capable of being substituted for each other on a weight basis, so that the ratio of calcium to magnesium chlorides in the process may vary in any proportions and the process is applicable to either calcium aconitate or magnesium aconitate as well as the mixed salt.

It will be apparent that if the same concentration of hydrochloric acid is employed with crude alkaline earth aconitates having the same composition and in the same proportions, the concentration of the alkaline earth chloride solution produced in the reaction will be the same as that of the mother liquor from a previous filtration step. Thus, in such a process, the concentration of the hydrochloric acid employed will determine the concentration of the alkaline earth chlorides in the mother liquor. A small excess of hydrochloric acid is desirably employed in the acid treatment step to insure completion of the reaction but this excess should not exceed approximately 15% of that theoretically required and will usually fall between approximately 5 and 10%.

The temperature of the acid treatment is determined not only by the solubility of the aconitic acid in the resulting alkaline earth chloride solution, but by the impurities present in the crude alkaline earth aconitates. In general, the higher the temperature, the more aconitic acid that is soluble in the solution, but temperatures substantially above 100° C. produce discoloration of the recovered aconitic acid. This is apparently due to reaction between the hydrochloric acid and such impurities. The exact nature of these impurities or the nature of the reaction is not definitely known, but it is known that increasing the concentration of the hydrochloric acid or increasing the temperature of the reaction or the time at the high temperature increases the discoloration of darkening of the recovered aconitic acid. The temperature can be increased up to approximately 105° C. without materially darkening the recovered aconitic acid and also can be decreased somewhat below 90° C., for example 80° C., but the solubility of the aconitic acid in the alkaline earth chloride solution drops rapidly as the temperature is lowered and greater dilution of the reaction mixture with alkaline earth chloride solution is required, thus increasing the amount of material handled in the process. The operative range of temperatures in the acid treatment step is therefore from approximately 80° to 105° C., the preferred range being between 90° and 100° C.

A lighter aconitic acid product can be produced if a small amount, for example about 1 to 5% based on the weight of the crude aconitates, of decolorizing agent, such as activated carbon, is employed in the acid treatment step. Any known finely divided absorptive material which is not attacked by the acid may be employed. Such material also acts as a filter aid in the filtration step 11, for removing the acid insolubles. The addition of a decolorizing agent does not materially increase the loss of aconitic acid with the acid insolubles. This is particularly true when the acid insolubles are washed with a substantial amount of alkaline earth chloride solution and the filtrate returned to the cooling and crystallization step. If the wash solution is the mother liquor from the filtration step 16, the amount of wash liquor is not critical as it is already saturated with aconitic acid at the crystallization temperature. Thus the amount of wash liquor may range from approximately 25 to 75 parts per 100 parts of crude aconitates being treated. The temperature of the wash liquor should be approximately that employed in the acid treatment step. After removal of the acid insolubles, the resulting filtrate may again be treated with a decolorizing material, if desired, and again filtered to remove the decolorizing agent prior to the cooling step.

The cooling of the alkaline earth chloride solution containing dissolved aconitic acid from the filtration step 11 should be relatively slow in order to produce the desired crystal growth. Thus, a cooling period ranging from approximately 2 to 24 hours, preferably 2 to 6 hours, is contemplated. An excellent yield of aconitic acid can be produced by cooling to 20° to 25° C., i. e., usual ambient temperatures, without refrigeration. A further yield of aconitic acid crystals can be obtained by refrigerating to approximately 5° C. and the cost of refrigeration in a particular process balanced against the increased yield will determine whether refrigeration should be employed. When refrigeration is not employed, it may be economical in some cases to recover additional aconitic acid from the mother liquor discharged from the process above described. If the alkaline earth chlorides are to be recovered, this usually requires a concentration of the mother liquor and upon concentration of this liquor to the point at which the liquor is very nearly saturated with alkaline earth chlorides at ambient temperatures, an additional amount of aconitic acid crystals can be recovered from the mother liquor. These crystals may be added to the crystals obtained in the filtration step 16 and washed in the washing step 18 to recover an additional amount of substantially pure aconitic acid after drying.

There is no necessity for cooling the aqueous hydrochloric acid employed to wash the aconitic acid crystals, although this can be done if desired. Cooling the hydrochloric acid reduces the amount of aconitic acid dissolved in the aqueous hydrochloric acid wash, but no loss of aconitic acid is caused by solution in the aqueous hydrochloric acid since the wash liquor is returned to the process. Thus, the temperature of the aqueous hydrochloric acid employed to wash the aconitic acid crystals may vary between approximately 5° to 35° C. This temperature may even be somewhat higher if closed apparatus is employed to prevent loss of hydrochloric acid in vapor form. The crystals may be washed in stages, for example, using one-third of the aqueous hydrochloric acid for each washing, as a somewhat purer aconitic acid is thereby produced. A preferred operation is to filter the aconitic acid crystals in a basket type centrifugal and then to wash the crystals while still in the centrifugal by spraying a stream of aqueous hydrochloric acid thereon. It is frequently unnecessary to employ all of the aqueous hydrochloric acid used in the process to wash the crystals in order to produce a substantially pure aconitic acid.

The concentration of the aqueous hydrochloric acid employed to wash the aconitic acid crystals may be substantially the same as that introduced into the acid treating step as discussed above. Increasing the concentration of the hydrochloric acid causes an increased loss of hydrochloric acid by adherence to the crystals discharged from the washing step. Decreasing the concentration of the hydrochloric acid causes increased amounts of aconitic acid to be dissolved in the washing liquid at the temperature employed. The loss of hydrochloric acid on the crystals may, however, be substantially lessened by employing as a washing liquid for the crystals, aqueous hydrochloric acid having a concentration in the lower portion of the range or below the range given for reaction with the alkaline earth aconitates and in an amount less than that required in the process and then blending the resulting liquid after the washing step with an amount of stronger aqueous hydrochloric acid solution giving the desired amount and concentration for reacting with additional aconitates. Thus, hydrochloric acid solutions having a concentration as low as approximately 10% may be used as a washing liquid for the crystals. This somewhat increases the amount of aconitic acid dissolved from the crystals in the washing operation but the dissolved aconitic acid is returned to the process and later recovered. The concentration of the aqueous hydrochloric acid used as a washing liquid for the crystals may thus vary from approximately 10% to 35% and may vary in amount from approximately one-half to approximately three times the amount of the impure crystals being washed. It is impractical to employ water or very dilute solutions of hydrochloric acid for washing as an excessive amount of aconitic acid is dissolved in the washing liquid.

As an indication of the increased yield and improved purity of the product when aqueous hydrochloric acid is employed as a washing liquid as compared with water and the improved purity of the product without decrease in yield as compared with operations in which no washing liquid is employed, the following table is given:

*Table II*

| Run No | A | B | C | D | E |
|---|---|---|---|---|---|
| Weight of Wet Crystals | 20 | 20 | 20 | 20 | 20. |
| Wash Treatment | Aqueous HCl | Aqueous HCl | Aqueous HCl | None | Water. |
| Concentration HCl | 15% | 25% | 35% | | |
| Temperature of Wash Liquid | 23° C | 23° C | 23° C | | 23° C. |
| Volume of Wash Liquid | 40 ml | 40 ml | 55 ml | | 40 ml. |
| Dry weight of Washed Crystals | 14.7 | 15.8 | 16.5 | 18.0 [1] | 7.1. |
| Ash Content | 0.01% | 0.02% | 0.02% | 3.64% | 1%. |
| Aconitic Acid Content | 99.7% | 99.7% | 99.6% | 90% | 96.5%. |
| Weight of Aconitic Acid in Crystals | 14.7 | 15.8 | 16.4 | 16.2 | 6.8. |

[1] Unwashed.

It will be noted that all of the concentrations of aqueous hydrochloric acid tried, resulted in a purity of final product of at least 99.6% as compared to 90% when no wash liquid was employed and 96.5% when water was employed. Also, the yield of actual aconitic acid increased with concentration of the aqueous hydrochloric acid until substantially all of the aconitic acid was recovered when the concentration reached 35%, but this increased yield must be balanced against increased loss of hydrochloric acid on the washed crystals with increased concentration, particularly when it is remembered that any aconitic acid dissolved in the aqueous hydrochloric acid wash liquor can be substantially all recovered in the process. The high impurity content of the unwashed crystals of run D makes it necessary to wash the crystals and the high impurity content of the water-washed crystals, as well as the low yield, renders this operation impractical.

To illustrate the improved yield when an alkaline earth chloride solution of proper concentration is added to the aqueous hydrochloric acid used to react with a crude alkaline earth aconitate, and also when such a solution is employed to wash the acid insoluble residue and returned to the system, the following table is given in which all weights are in grams:

In all cases in the above table the temperature of reaction, filtration of acid insolubles, and washing of acid insolubles was between 90° and 100° C. and the temperature of filtration of the aconitic acid crystals and washing thereof was between 20° and 25° C. It will be noted that runs 1 and 2 are the same except that in run 2, alkaline earth chloride solution in an amount equal to the weight of the crude aconitate and having a concentration of 28.1% was added to the reaction. The acid insolubles were not washed to recover adhering aconitic acid, but the crystals produced upon cooling were washed with aqueous hydrochloric acid to produce a purity of approximately 99.7%. Addition of the alkaline earth chloride solution to the reaction increased the yield of crystals from 72 to 81 grams, even though the added chloride solution contained no aconitic acid from a previous run. In run 1, the aconitic acid produced in the reaction reached saturation in the liquid therein before all of the aconitate was reacted and dissolved.

Runs 5 and 6 are similar to runs 1 and 2, respectively, except that a higher concentration, and therefore a less weight, of aqueous hydrochloric acid was employed in the reaction, the acid insolubles were washed with alkaline earth chloride solution to recover adhering aconitic acid and a higher concentration and greater amount of aqueous hydrochloric acid was employed to wash the aconitic acid crystals. In run 5, no alkaline earth chloride solution was added to the reaction and the poor yield was due to the high concentration of the hydrochloric acid causing saturation of the reaction solution with aconitic acid without dissolving all aconitic acid present. In run 6, sufficient alkaline earth chloride solution was added to the reaction to prevent such saturation and this increased the yield from the 37 grams of run 5 to the 93 grams of run 6. The higher yield of run 6, as compared to run 2, is partly due to the washing of the acid insolubles with alkaline earth chloride solution to prevent loss of aconitic acid and partly due to the use of a more concentrated aqueous hydrochloric acid to wash the aconitic acid crystals.

Runs 3 and 4 are intermediate between runs 1 and 2 on the one hand and runs 5 and 6 on

*Table III*

| Run | 1 | 2 | 3 | 4 | 5 | 6 |
|---|---|---|---|---|---|---|
| Weight of Aconitate | 200 | 200 | 200 | 200 | 200 | 200 |
| Weight Aqueous HCl (Reaction) | 325 | 325 | 309 | 309 | 260 | 260 |
| Concentration of Aqueous HCl (Reaction) percent | 25 | 25 | 25 | 25 | 30 | 30 |
| Weight of chloride solution added to reaction | None | 200 | None | 150 | None | 250 |
| Weight of Chloride solution used to wash acid Insolubles | None | None | 150 | 150 | 150 | 150 |
| Concentration Chloride Solution (Based on total solution) percent | | 28.1 | 27.0 | 27.0 | 33 | 33 |
| HCl in Chloride Solution (Based on total solution) do | 0 | 0 | 1 | 1 | 0 | 0 |
| Aconitic Acid in Chloride Solution (based on total solution) do | 0 | 0 | 1.5 | 1.5 | 0 | 0 |
| Weight of Aqueous HCl used to wash crystals | 169 | 169 | 225 | 225 | 230 | 230 |
| Concentration of Aqueous HCl wash Liquid percent | 25 | 25 | 25 | 25 | 30 | 30 |
| Weight of dry Aconitic Acid recovered | 72 | 81 | 76 | 93 | 37 | 93 | the other hand. The aqueous hydrochloric acid concentrations of runs 1 and 2 were employed and the acid insolubles were washed with an alkaline earth chloride solution. Even when no alkaline earth chloride solution was added to the reaction, as in run 4, the yield was better than run 1 because of the washing of the acid insolubles with alkaline earth chloride solution containing small amounts of hydrochloric acid and aconitic acid, and this was true even though the smaller excess of hydrochloric acid solution in the reaction reduced the amount of aconitic acid originally dissolved. Run 3 in which sufficient alkaline earth chloride solution to prevent saturation with aconitic acid was added to the reaction and all of the alkaline earth chloride solution used in the run contained a small amount of hydrochloric acid and aconitic acid from a previous run, produced a yield as great as run 6. The lower concentration of the hydrochloric acid employed to wash the aconitic acid crystals also decreased the amount of hydrochloric acid lost in the process from that of run 6.

From the above discussion of the invention, it is apparent that I have provided an improved process of recovering substantially pure aconitic acid from crude alkaline earth aconitates in a simple process involving a single crystallization step and in which all of the steps cooperate to provide an increased yield of aconitic acid.

In any of the claims where concentrations of hydrochloric acid are given they are based upon the weight of the total amount of water and hydrochloric acid present exclusive of other materials and where concentrations of alkaline earth chlorides are given they are based upon the weight of the total amount of water and such chlorides exclusive of other materials.

While I have disclosed the preferred embodiments of my invention, it is understood that the details thereof may be varied within the scope of the following claims.

I claim:

1. The process of recovering substantially pure aconitic acid from alkaline earth aconitates which comprises, reacting said aconitates at an elevated temperature with a small excess of hydrochloric acid in the presence of a substantial added amount of an aqueous solution of alkaline earth chlorides to produce aconitic acid dissolved in a solution of alkaline earth chlorides the concentration of said aqueous hydrochloric acid and the amount and concentration of said added solution being selected to produce a resulting solution of alkaline earth chlorides having a concentration between approximately 21 and 35% and containing dissolved aconitic acid, separating said heated solution from undissolved material, thereafter cooling said solution to produce crystals of aconitic acid, separating said crystals from the cooled solution and washing said crystals with aqueous hydrochloric acid to remove residual alkaline earth chloride solution.

2. The process of recovering substantially pure aconitic acid from alkaline earth aconitates which comprises, reacting said aconitates at an elevated temperature with a small excess of aqueous hydrochloric acid in the presence of a substantial added amount of an aqueous solution of alkaline earth chlorides to produce aconitic acid dissolved in a solution of alkaline earth chlorides the concentration of said aqueous hydrochloric acid and the amount and concentration of said added solution being selected to produce a resulting solution of alkaline earth chloride having a concentration between approximately 21 and 35% and containing dissolved aconitic acid, separating said heated solution from undissolved material, thereafter cooling said solution to produce crystals of aconitic acid, separating said crystals from the cooled solution, washing said crystals with aqueous hydrochloric acid to remove residual alkaline earth chloride solution, and drying said crystals to remove residual hydrochloric acid and water.

3. The process of recovering substantially pure aconitic acid from alkaline earth aconitates which comprises, reacting said aconitates with a small excess of aqueous hydrochloric acid at an elevated temperature in the presence of a substantial added amount of an aqueous solution of alkaline earth chlorides to produce aconitic acid dissolved in a solution of alkaline earth chlorides, the concentration of said aqueous hydrochloric acid and the amount and concentration of said added solution being selected to produce a resulting solution of alkaline earth chlorides having a concentration between approximately 21 and 35% and containing dissolved aconitic acid cooling said solution to produce crystals of aconitic acid and separating said crystals from the cooled solution.

4. The process of recovering substantially pure aconitic acid from alkaline earth aconitates which comprises, reacting said aconitates with aqueous hydrochloric acid in the presence of a substantial added amount of an aqueous solution of alkaline earth chlorides to produce aconitic acid dissolved in a solution of alkaline earth chlorides, cooling said solution to produce crystals of aconitic acid and separating said crystals from the cooled solution, said added amount of alkaline earth chlorides being at least approximately 50% of said alkaline earth aconitates and being substantially saturated with aconitic acid at the temperature of separation of aconitic acid crystals from said cooled solution.

5. The process of recovering substantially pure aconitic acid from alkaline earth aconitates which comprises, reacting said aconitates with aqueous hydrochloric acid at an elevated temperature to produce aconitic acid dissolved in a solution of alkaline earth chlorides, cooling said solution to produce crystals of aconitic acid, separating said crystals from the cooled solution, washing said crystals with aqueous hydrochloric acid to remove residual alkaline earth chloride solution, and employing the last-mentioned aqueous hydrochloric acid containing said residual alkaline earth chlorides and a small amount of dissolved aconitic acid as a component of the reaction mixture in the first mentioned reaction step.

6. The process of recovering substantially pure aconitic acid from alkaline earth aconitates, which comprises, reacting said aconitates with a small excess of aqueous hydrochloric acid in the presence of an added amount of an aqueous solution of alkaline earth chlorides and at a temperature between approximately 80° and 105° C., the concentration of said aqueous hydrochloric acid and the amount and concentration of said added solution being selected to produce a resulting solution of alkaline earth chlorides having a concentration between approximately 21 and 35% and containing dissolved aconitic acid, cooling said resulting solution to a temperature between approximately 5° and 30° C. to produce a cooled solution containing crystals of aconitic acid and recovering substantially pure crystals of aconitic acid from the cooled solution.

7. The process of recovering substantially pure aconitic acid from crude alkaline earth aconitates, which comprises, reacting said aconitates with an excess between approximately 5 and 15% of aqueous hydrochloric acid in the presence of an added amount of an aqueous solution of alkaline earth chlorides and at a temperature between approximately 80° and 105° C., the concentration of said aqueous hydrochloric acid and the amount and concentration of said added solution being selected to produce a resulting solution of alkaline earth chlorides having a concentration between approximately 21 and 35% and containing dissolved aconitic acid substantially below saturation at said temperature, separating undissolved material from said resulting solution at approximately said temperature, cooling said resulting solution to a temperature between approximately 5° and 30° C. to produce a cooled solution containing crystals of aconitic acid and recovering substantially pure crystals of aconitic acid from the cooled solution.

8. The process of recovering substantially pure aconitic acid from alkaline earth aconitates, which comprises, reacting said aconitates with a small excess of aqueous hydrochloric acid in the presence of an added amount of an aqueous solution of alkaline earth chlorides and at a temperature between approximately 80° and 105° C., the concentration of said aqueous hydrochloric acid and the amount and concentration of said added solution being selected to produce a resulting solution of alkaline earth chlorides having a concentration between approximately 21 and 35% and containing dissolved aconitic acid, cooling said resulting solution to a temperature between approximately 5° and 30° C. to produce a cooled solution containing crystals of aconitic acid and recovering substantially pure crystals of aconitic acid from the cooled solution, said added solution of alkaline earth chlorides having a composition substantially the same as that of said cooled solution from which said crystals have been recovered and being substantially saturated with aconitic acid at the temperature of the cooled solution.

9. The process of recovering substantially pure aconitic acid from alkaline earth aconitates, which comprises, reacting said aconitates with a small excess of aqueous hydrochloric acid in the presence of an added amount of an aqueous solution of alkaline earth chlorides and at a temperature between approximately 80° and 105° C., the concentration of said aqueous hydrochloric acid and the amount and concentration of said added solution being selected to produce a resulting solution of alkaline earth chlorides having a concentration between approximately 21 and 35% and containing dissolved aconitic acid, cooling said resulting solution to a temperature between approximately 5° and 30° C. to produce a cooled solution containing crystals of aconitic acid, filtering said crystals from said cooled solution, and washing said crystals with aqueous hydrochloric acid having a concentration between approximately 17 and 35% and at a temperature between approximately 5° and 35° C. to remove said residual alkaline earth chlorides on said crystals.

10. The process of recovering substantially pure aconitic acid from alkaline earth aconitates, which comprises, reacting said aconitates with a small excess of aqueous hydrochloric acid in the presence of an added amount of an aqueous solution of alkaline earth chlorides and at a temperature between approximately 80° and 105° C., the concentration of said aqueous hydrochloric acid and the amount and concentration of said added solution being selected to produce a resulting solution of alkaline earth chlorides having a concentration between approximately 21 and 35% and containing aconitic acid, cooling said resulting solution to a temperature between approximately 5° and 30° C. to produce a cooled solution containing crystals of aconitic acid, filtering said crystals from said cooled solution, washing said crystals with aqueous hydrochloric acid having a concentration between approximately 17 and 35% and at a temperature between approximately 5° and 35° C. to remove residual alkaline earth chlorides on said crystals, and utilizing the last mentioned aqueous hydrochloric acid in said process to react with an additional amount of alkaline earth aconitates in the presence of added alkaline earth chloride solution at a temperature between approximately 80° and 105° C.

11. In a process of recovering aconitic acid in which alkaline earth aconitates are reacted with hydrochloric acid to form aconitic acid and crystals of said aconitic acid are separated from an aqueous solution of alkaline earth chlorides, the steps which comprise, washing the separated crystals with aqueous hydrochloric acid at a temperature between approximately 5° and 35° C. to remove residual alkaline earth chloride solution from said crystals and employing said last mentioned aqueous hydrochloric acid containing alkaline earth chlorides as a component of the reaction mixture in said first mentioned reaction.

12. In a process of recovering aconitic acid in which alkaline earth aconitates are reacted with hydrochloric acid to form aconitic acid and crystals of aconitic acid are separated from an aqueous solution of alkaline earth chlorides, the steps which comprise, producing a heated solution of alkaline earth chlorides having a concentration between approximately 21 and 35% and containing dissolved aconitic acid, cooling said solution to a temperature between approximately 5° and 30° C. to produce crystals of aconitic acid, separating said crystals from the cooled solution, washing said crystals with aqueous hydrochloric acid, and then employing the last mentioned aqueous hydrochloric acid containing alkaline earth chlorides and a small amount of dissolved aconitic acid as a component of the reaction mixture in said first mentioned reaction.

13. In a process of recovering aconitic acid in which crystals of aconitic acid are separated from an aqueous solution of alkaline earth chlorides, the steps which comprise producing said solution by reacting alkaline each aconitates with aqueous hydrochloric acid in an excess between approximately 5 and 15% at a temperature between approximately 80° and 105° C., and in the presence of added alkaline earth chloride solution in an amount and concentration producing a resulting alkaline earth chloride solution having a concentration between approximately 21 and 35% and containing dissolved aconitic acid in an amount substantially below saturation at said temperature.

14. In a process of recovering aconitic acid in which crystals of aconitic acid are separated from an aqueous solution of alkaline earth chlorides, the steps which comprise producing said solution by reacting alkaline earth aconitates with aqueous hydrochloric acid in an excess between approximately 5 and 15% at a temperature between approximately 80° and 105° C. for a time not greater than approximately 1 hour and in the presence of added alkaline earth chloride solution in an amount and concentration producing a resulting alkaline earth chloride solution having a concentration between approximately 21 and 35% and containing dissolved aconitic acid in an amount substantially below saturation at said temperature, cooling the resulting solution to precipitate aconitic acid crystals, and recovering said crystals from the cooled solution.

15. The process of recovering substantially pure aconitic acid from crude alkaline earth aconitates, which comprises, forming a reaction mixture by admixing said aconitates, aqueous hydrochloric acid having a concentration between approximately 20 and 30% and an aqueous solution of alkaline earth chlorides having a concentration between approximately 24 and 33.5%, said hydrochloric acid being added in an excess between approximately 5 and 15% and containing small amounts of alkaline earth chlorides and aconitic acid, said solution being added in an amount between approximately 50 and 150% of said aconitates and containing small amounts of aconitic acid and hydrochloric acid, reacting said mixture at a temperature between approximately 90° and 100° C. for a time between approximately 20 and 60 minutes to produce a heated solution of alkaline earth chlorides having a concentration between approximately 24 and 33.5% in which is dissolved aconitic acid and containing small amounts of hydrochloric acid and insoluble matter, filtering said heated solution to remove said insoluble matter, thereafter cooling the filtered solution to a temperature between approximately 5° and 30° C. to form crystals of aconitic acid, filtering said cooled solution to separate said crystals, returning a portion of the resulting filtered solution to the process as part of a succeeding reaction mixture, washing the separated crystals with aqueous hydrochloric acid having a concentration between approximately 20 and 30% to remove residual alkaline earth chloride solution, and returning the resulting aqueous hydrochloric acid to said process as part of a succeeding reaction mixture.

HOWARD F. REEVES, Jr.

REFERENCES CITED

The following references are of record in the file of this patent:

UNITED STATES PATENTS

| Number | Name | Date |
|---|---|---|
| 2,345,079 | Ventre et al. | Mar. 20, 1944 |
| 2,359,537 | Ventre et al. | Oct. 3, 1944 |

OTHER REFERENCES

Hentschel, J. Prakt. Chem. (2), vol. 35, page 205 (1887).

Easterfield et al., J. Chem. Soc., vol. 61, page 1007 (1892).

Bland et al., J. Chem. Soc., vol. 101, page 1497 (1912).

Ingold et al., J. Chem. Soc., vol. 125, page 2133 (1924).

Malochowski et al., Ber. Deut. Chem., vol. 61, page 2523 (1928).

Ventre et al., Ind. Eng. Chem., vol. 38, page 201 (1946).

Certificate of Correction

Patent No. 2,514,010 July 4, 1950

HOWARD F. REEVES, Jr.

It is hereby certified that error appears in the printed specification of the above numbered patent requiring correction as follows:

Column 13, line 48, before the word "hydrochloric" insert *aqueous*; column 15, lines 12 and 13, for "salution" read *solution*; column 16, line 60, for "each" read *earth*; column 17, line 3, for "105% C." read *105° C.*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*